United States Patent [19]

Yamada et al.

[11] Patent Number: 4,713,760
[45] Date of Patent: Dec. 15, 1987

[54] TRANSACTION PROCESSING SYSTEM FOR SEPARATE REGISTRATION AND SETTLEMENT FUNCTIONS

[75] Inventors: Kazutoshi Yamada, Nagaokakyo; Takao Yamaguchi, Joyo, both of Japan

[73] Assignee: Omron Tateisi Electronics Co., Kyoto, Japan

[21] Appl. No.: 743,398

[22] Filed: Jun. 11, 1985

[30] Foreign Application Priority Data

Jun. 11, 1984 [JP] Japan ............................ 59-120497

[51] Int. Cl.⁴ .............................................. G06F 15/20
[52] U.S. Cl. ..................................... 364/405; 364/900
[58] Field of Search .............. 364/405, 404, 400, 401, 364/200 MS File, 900 MS File; 235/379, 380, 381; 340/825.34, 825.33

[56] References Cited

U.S. PATENT DOCUMENTS

| | | | |
|---|---|---|---|
| 4,317,957 | 3/1982 | Sendrow | 235/379 X |
| 4,471,434 | 9/1984 | Iwawaki | 364/405 |
| 4,570,223 | 2/1986 | Yoshimoto | 364/405 |
| 4,607,334 | 8/1986 | Shiono et al. | 364/405 |
| 4,630,200 | 12/1986 | Ohmae et al. | 364/405 |
| 4,650,978 | 3/1987 | Hudson et al. | 238/380 |
| 4,673,802 | 6/1987 | Ohmae et al. | 235/379 |

*Primary Examiner*—Jerry Smith
*Assistant Examiner*—Charles Meyer
*Attorney, Agent, or Firm*—Schwartz, Jeffery, Schwaab, Mack, Blumenthal & Evans

[57] ABSTRACT

A transaction processing system comprises an electronic cash register machine (ECR) and a balance settling machine. The ECR includes a keyboard from which the figures for individual items in one transaction are entered, and a memory in which the cumulative records of the figures are stored. An actual amount of money temporarily paid by a customer for the purchased items is also entered from the keyboard. A balance data representing an outstanding balance of money to be returned to the customer is calculated in the ECR. A recording medium on which the appropriate identification (ID) code is recorded is handed to the customer. The cash transaction data and the appropriate balance data together with the customer's ID code are sent to the balance settling machine.

When the customer inserts his or her recording medium into the balance, settling machine, the ID code on the recording medium is read. The transaction data received from the ECR and corresponding to the ID code read is printed out and a receipt slip is issued. The balance of money equivalent to the appropriate balance data is delivered from the balance settling machine.

8 Claims, 13 Drawing Figures

TRANSACTION PROCESSING SYSTEM FOR SEPARATE REGISTRATION AND SETTLEMENT FUNCTIONS

BACKGROUND OF THE INVENTION

The present invention relates generally to a transaction processing system including electronic cash registers (which are hereinafter referred to collectively as "ECR") each of which provides its primary function of recording sales transactions and its subsidiary function of serving as a till or cash drawer. More specifically, the subsidiary function of the ECR, which usually involves handling change by a human operator, is physically separated from the ECR, an instead that function is implemented by an independent machine that handles change in response to a transaction data concerning each item or service entered on the ECR.

In the conventional transaction processing system, each of the ECR's provides those primary and subsidiary functions, which are operated by the human operator as each sales transaction occurs. Those operations require extra human labor such as handing change to each customer who needs it, and replacing paper rolls in the printer. Such extra labor adversely affects the operator's working efficiency. For implementing those functions, therefore, each of the ECR's contains a printer for issuing a receipt slip that helps the operator perform the settling operation, and a till or cash drawer in which cash paid by the customer or small money prepared as change is kept. This raises the problem of increasing the hardware cost of the ECR and the problem of noises produced by the printer.

SUMMARY OF THE INVENTION

It is therefore a principal object of the present invention to provide a transaction processing system in which the settling function involving the manual handling of change, which is contained in the existing ECR, is separated from the ECR machine, and instead that function is implemented by an independent machine that provides the automatic outstanding balance settling functions so that the operator can only take care of the cash registering operation in order to increase his or her working efficiency. Thus, the hardware such as printer and cash drawer is eliminated from the ECR, and ECR's hardware cost can be reduced. The enhanced reliability can also be achieved, and the noises from the printer can be eliminated.

Briefly described, the transaction processing system according to the present invention includes a cash register machine and an outstanding balance settling machine. The cash register machine includes input means from which the figures for individual items in one transaction are entered, and memory means in which the cummulative records of the figures are stored. When the customer actually pays what is due for this transaction, which amount data is also entered from the input means and stored in memory, the central processing function in the cash register machine responds, determining whether there is any outstanding balance to be returned to the customer, based on the cumulative figure records and the actual amount data, and if so, performs the arithmetic operation to find the exact balance data. Then, the recording medium on which the appropriate identification (ID) code is recorded is handed to the customer. Internally, the cash transaction data for that customer and, if any, the appropriate balance data are delivered to the balance settling machine.

When the customer inserts his or her recording medium into the reading slot in the balance settling machine, it responds, reading the ID code on the recording medium, and then it prints out that customer's transaction data received from the cash register machine and corresponding to the ID code read from the recording medium and issues a receipt slip. If there is an outstanding balance, the machine returns the money equivalent to the balance through its change outlet port. If there is no balance, no settling operation occurs within the machine. It should be understood that the sales transaction items include services.

As readily understood from the foregoing description, the balance settling and receipt slip issuing functions are separated from the cash register machine and are instead provided by the balance settling machine that is specifically designed for those purposes. Therefore, the operator is only required to ensure that the transaction data for the customer's purchased items is entered on the cash register and hand the recording medium containing the corresponding ID code to the customer. Thus, the operator is relieved from the extra manual work such as the change handling, care in reserving small money, and printer paper roll replacement, and can improve his or her working ability. The printer contains many mechanical parts or elements that easily cause physical defects. According to the present invention, however, the printing mechanism is eliminated from the cash register machine, which can provide the improved reliability. This also reduces the hardware cost of the cash register machine. In addition, as the cash drawer, if any, can only be used to contain the cash paid by the customer, not to keep small money reserved as change, its construction can be simplified. Eliminating the mechanical parts such as printing mechanism from the cash register machine also eliminates the noises produced from those parts. In commercial stores such as super-markets where many ECR's are to be installed, only a few balance settling machines need to be installed for many number of cash register machines to be installed. As such, any additional expenses that would arise when the costly, full-function ECR's are to be installed in a large number could be saved. As the balance settling machine takes over the manual tasks for which in the past the operator has been responsible, the operator needs only to make sure that data entries are made correctly, checking for the correct amount of money temporarily received. Thus, the time required for processing a given transaction can be reduced. As the operator can process individual transactions in the short time, the number of ECR's to be installed can be reduced even in a store where a crowd of people are expected to come in. Therefore, the labor saving can be achieved by reducing the corresponding number of operators. As a further feature, small change money to be reserved can be kept to as little as possible, since the appropriate amount of change is managed and actually returned by the balance settling machine.

BRIEF DESCRIPTION OF THE DRAWINGS

Other objects and features of the present invention will be become apparent from the detailed description of several preferred embodiments that follows with reference to the accompanying drawings, in which:

FIG. 12 is a flowchart showing the processing steps required when the negative file is searched for.

DESCRIPTION OF THE PREFERRED EMBODIMENTS

Figure 1:
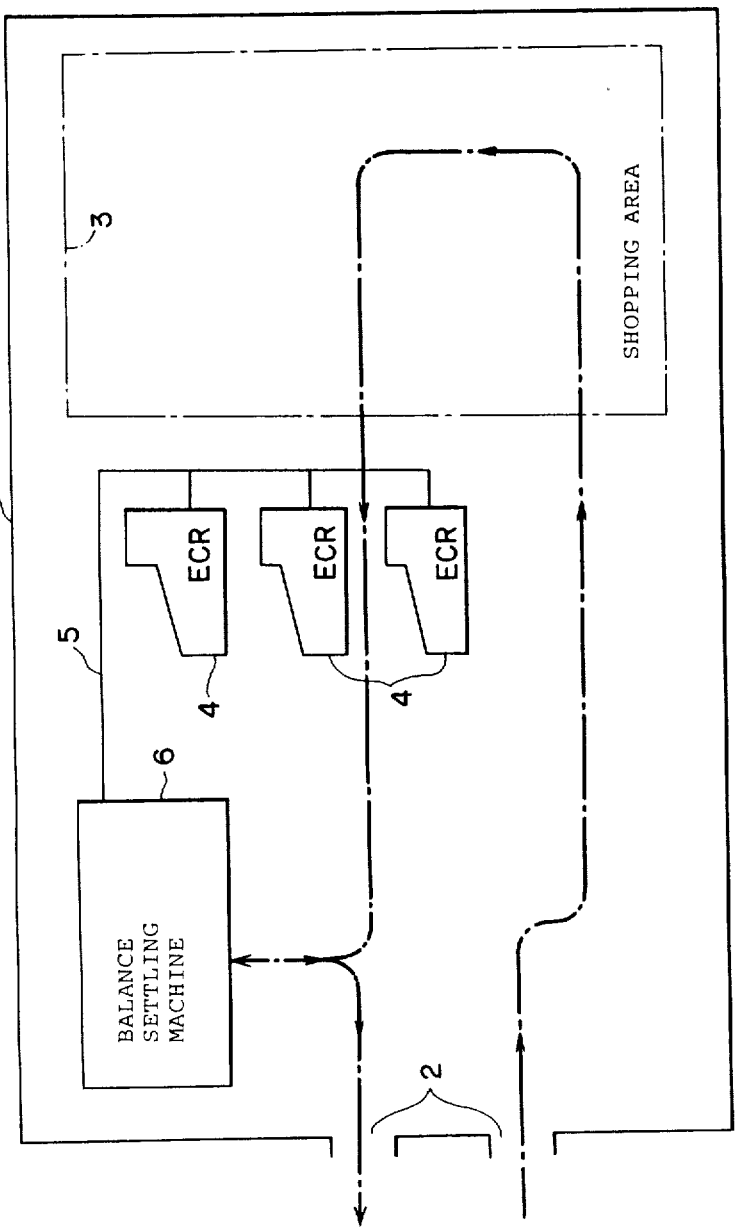
FIG. 1 is a diagram of an example of the floor layout, showing how the individual machines offered by the present invention are located.

FIG. 1 is a general layout diagram for the individual machines configured in the transaction processing system according to one preferred embodiment of the present invention. Referring first to FIG. 1, the general constructional features are briefly described. A customer enters a store 1 through an entrance door or port 2, and goes on to a shoppinig area 3, where the customer picks items up as he or she needs. A number of ECR's 4 (electronic cash register machines) 4 are located on the exit side of the shopping area 3, and a balance settling machine 6 is located nearer to the entrance or exit port 2. This balance settling machine 6 is connected through a data line cable 5 to each of the ECR's 4. The customer, who has left the shopping area 3 after shopping, goes to any of the ECR's 4, where he or she has the operator record data concerning each of the purchases.

When the operator has completed all entry operation, he or she asks the customer whether the current transaction should be credited or debited, or paid for in cash. For the customer who wants the payment to be credited or debited (this type of customer is hereinafter referred to as "card customer"), the operator asks the customer to insert his or her credit card (which is hereinafter referred to as "customer card") into the card reader (not shown) on the ECR 4. This concludes the transaction processing. For the customer who wants the transaction to be paid for in cash (this type of customer is hereinafter referred to as "cash customer"), the operator asks for the amount of money for the purchases. The amount paid may be greater than or equal to what is due. In this case, a magnetic card (which is referred to as "in-house card") on which previously defined class codes and transaction number are magnetically recorded is inserted into the card reader, which reads the class code and transaction number on the magnetic card. After reading, the magnetic card is removed and handed over to the customer. At this time, the transaction data including card data for that customer is sent through the data line 5 to the balance settling machine 6.

The customer then carries the in-house magnetic card to the balance settling machine 6, where the card is inserted. Within the balance settling machine 6, the class code and transaction number on the magnetic card are read by the card reader, and validity checking is made to see whether that magnetic card is valid or not. If there is no problem, a receipt slip is issued, and if the transaction data from the ECR contains any outstanding balance data, the amount of money that is equivalent to that balance data is returned through the outlet to the customer. By now, all transaction processing is completed. For the credited transaction, only a receipt slip is issued.

Figure 2:
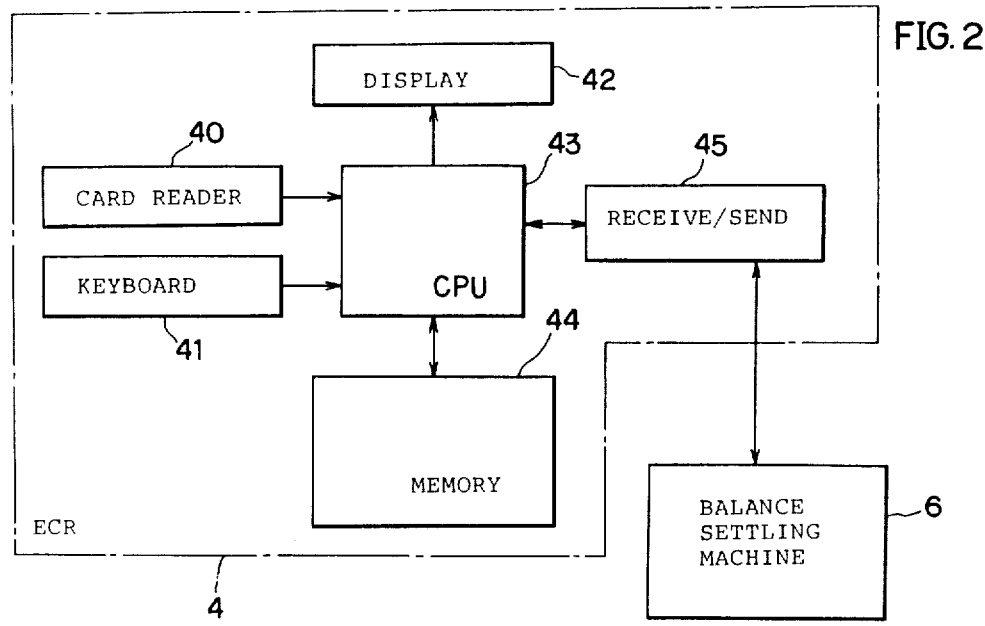
FIG. 2 is a schematic block diagram showing the arrangement of the elements within the ECR (electronic cash register machine) in its embodied example.

FIG. 2 is a schematic block diagram for the ECR contained in one preferred embodiment of the present invention. As particularly shown in FIG. 2, the ECR 4 includes a card reader 40, a keyboard 41, a display 42, CPU (Central Processing Unit) 43, a memory 44, and a receive/send interface 45. The card reader 40 reads the data on the credit card when the customer wants his or her transaction to be credited, and writes given data on the in-house card which is to be handed to the customer or reads the data from the in-house card. The keyboard 41 allows the operator to enter the figures for each of the items purchased by the customer. Its details will be given later by referring to FIG. 3. The display 42 indicates the figures for each purchased item and the corresponding group codes as they are entered on the keyboard 41, and the total amount of for those figures. CPU 43 operates in accordance with the instructions contained in the stored programs, and performs the required registration-related functions. The memory 44 is implemented on RAM (random-access memory), for example, which contains data storage areas as shown in FIG. 5. This will be described later. The receive/send interface 45 provides a communication interface to the external balance settling machine 6, through which data from CPU 43 is delivered to the machine 6.

Figure 3:
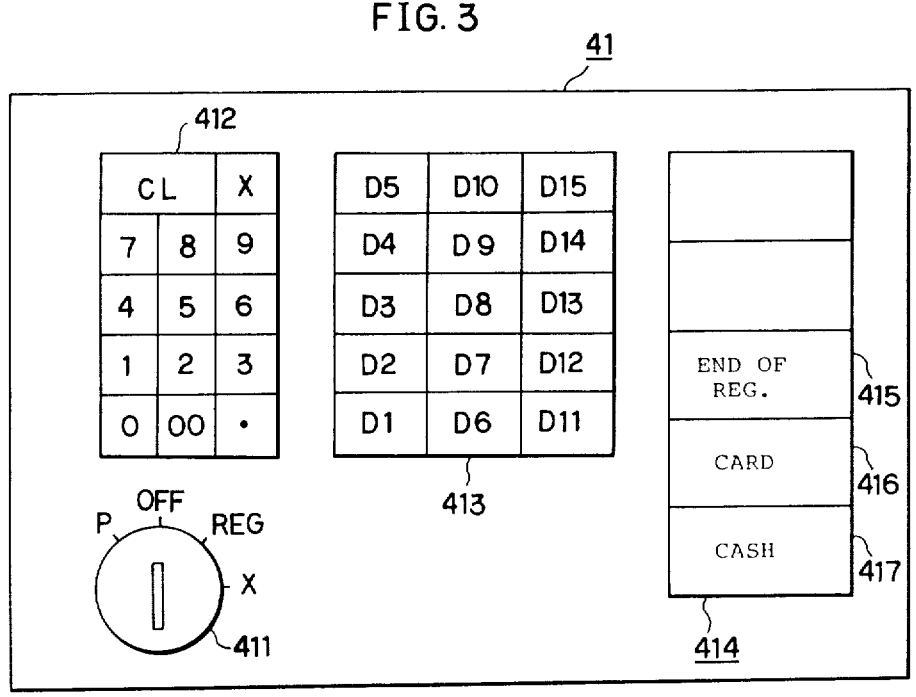
FIG. 3 illustrates a key arrangement on a keyboard that forms an integral part of the ECR in FIG. 2.
Figures 4, 5:
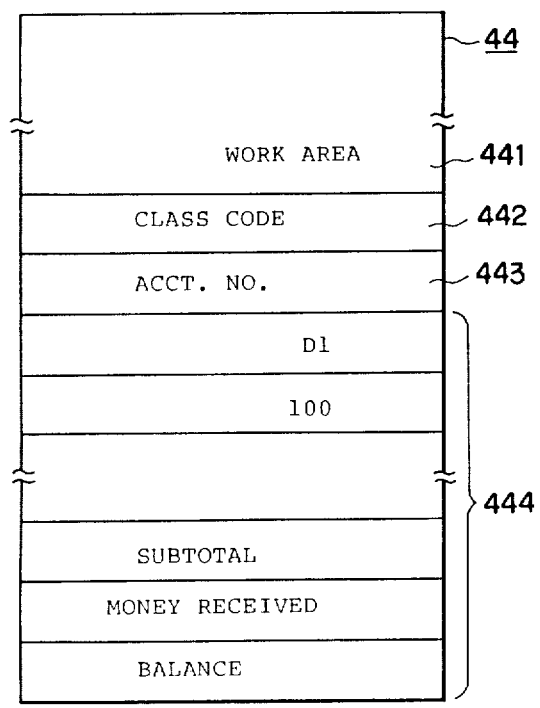
FIG. 4 illustrates an example of the format for the customer card or in-house card.
FIG. 5 illustrates the ECR storage area layout in which the appropriate data is stored.

FIG. 3 illustrates the key arrangement for the keyboard 41, which is a component of the ECR shown in FIG. 2. As shown in FIG. 3, the keyboard 41 includes a mode selector switch 411, a ten-key pad 412, a set of group keys 413, and operation keys 414. The mode selector switch 411 allows the operator to select any of the preset mode (P), power off, register mode (REG), and check mode (X) by setting it to the appropriate position. The ten-key pad 412 is used to enter numerical data such as price data for each item purchased by the customer. Group keys 413 are used to enter the corresponding group codes that have been defined and assigned to each class of goods or services. Operation keys 414 include End of Registration key 415, Card key 416, and Cash key 417. End of Registration key 415 is used when recording of a transaction data for a given customer is finished. Card key 418 is operated when a customer wants his or her transaction to be credited. Cash key 417 is used for cash transactions.

The format of the customer card or in-house card is shown in FIG. 4. As shown in FIG. 4, the customer card or in-house card contains a class code field 50, an account number field 51, and other fields 52 that are reserved for future use. The class code field 50 identifies the type of the card. For example, when this field contains a code of 0, this means the in-house card. Other digit codes imply the customer card. The account number field 51 identifies the account number or membership number for the customer card, or the transaction number for the in-house card.

FIG. 5 illustrates the storage areas in the memory 44 within the ECR 4 shown in FIG. 2, each area providing locations in which the appropriate data is to be stored. The storage areas or locations include the work area 441, class code area 442, account number area 443, and transaction area 444. Specifically, the work area 441 serves as a buffer in which data is temporarily held while being processed by CPU 43, which performs arithmetic operations on the data. The class code area 442 stores the class code read from the in-house card or customer card. The account number area 443 holds the transaction number or account number. The transaction area 444 is divided into several sub-areas, in which the corresponding transaction data is held, such as the figures for the customer purchased items or services and the corresponding group codes as entered by the operator on the ECR, the subtotals, the actual amount received, and the amount of any outsanding balance.

Figure 6:
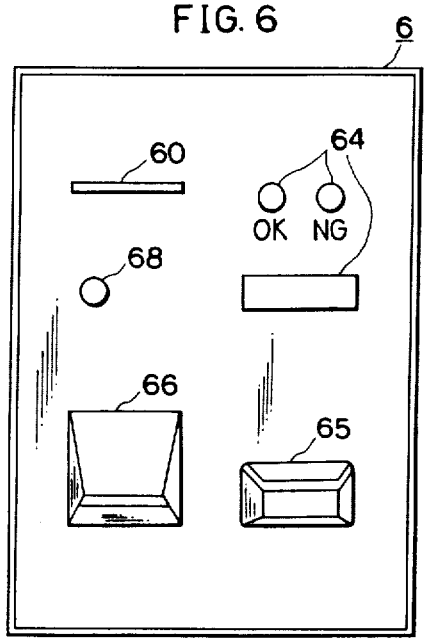
FIG. 6 is an outlook of the balance settling machine.

FIG. 6 shows the front panel of the balance settling machine 6 which is configured as a component of the transaction processing system. The front panel contains a card reader 60, a display 64 including two indicators, a change outlet 65, a printer 66, and a receipt suppress key 68, all located as shown in FIG. 6. The card reader 60 accepts the customer card or in-house card, and reads the class code and the account number of transaction number recorded on the card. The display window indicates the amount of outstanding balance, if any, and the indicator "OK" turns on if the card is valid, while the indicator "NG" turns on if the card is not valid. The change outlet 65 returns the balance of money when the customer wants his or her transaction to be paid for in cash and if the amount paid is more than what is due. The printer 66 issues a receipt slip. The receipt suppress key 68 is used when the customer wants no receipt. When this key is pressed, the printing or issuing is suppressed.

Figure 7:
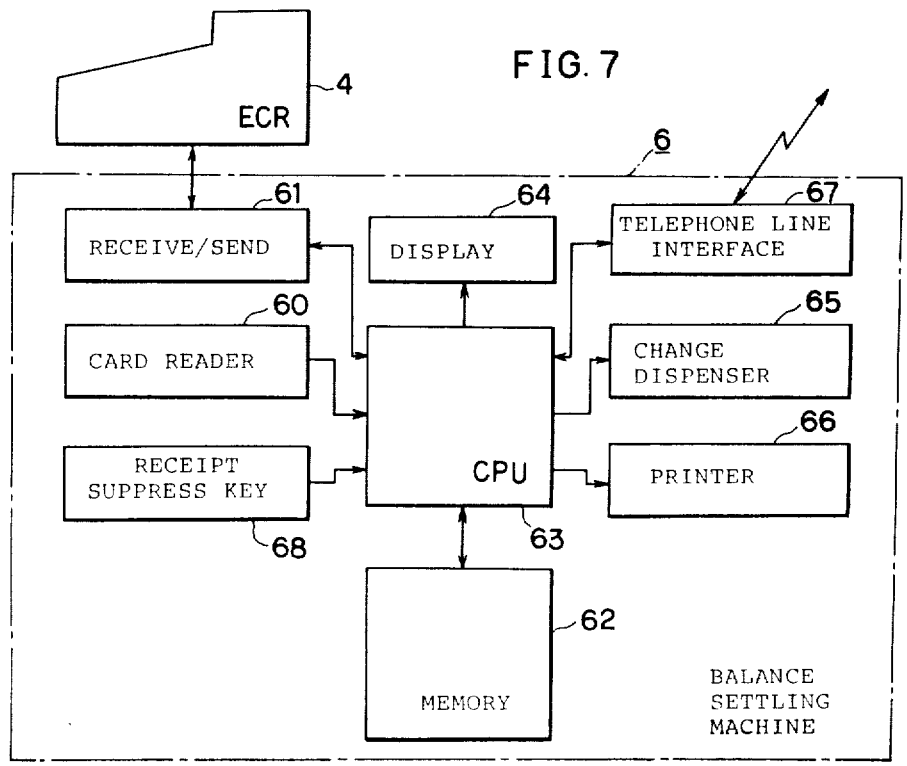
FIG. 7 is a schematic block diagram showing the arrangement of the elements within the balance settling machine.

FIG. 7 illustrates the schematic block diagram of the associated elements within the balance settling machine 6. The balance settling machine 6 contains the card reader 60 as previously described in FIG. 6, a receive/-send interface 61, a memory 62, CPU 63, the display 64, change dispenser 65, printer 66, a telephone line interface 67, and the receipt suppress key 68. The receive/-send interface 61 connects to the counterpart receive/-send interface 45 within the ECR 4 described in FIG. 2, and accepts the various types of data sent from the ECR's. The memory 62 is implemented on memory chips such as RAM, and holds the negative file 621 later to be described in FIG. 8 as well as the transaction area 624 as shown in FIG. 9.

Figure 8:
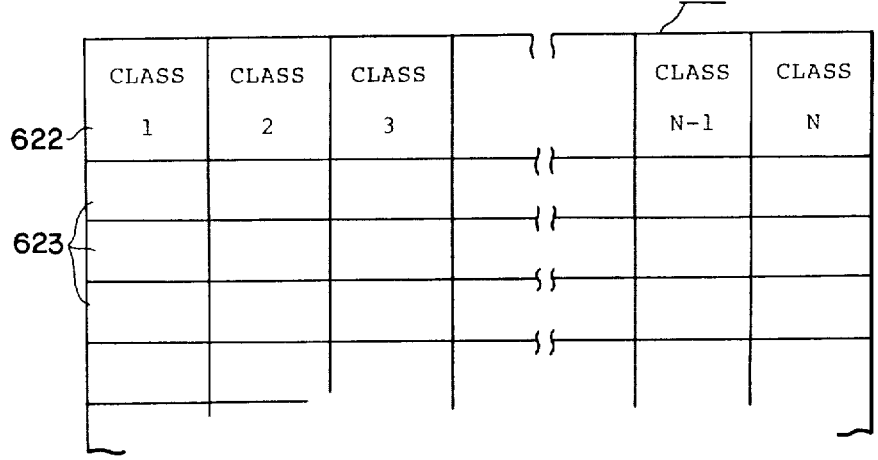
FIG. 8 illustrates the format of a negative file which resides in the memory element within the balance settling machine.
Figure 9:
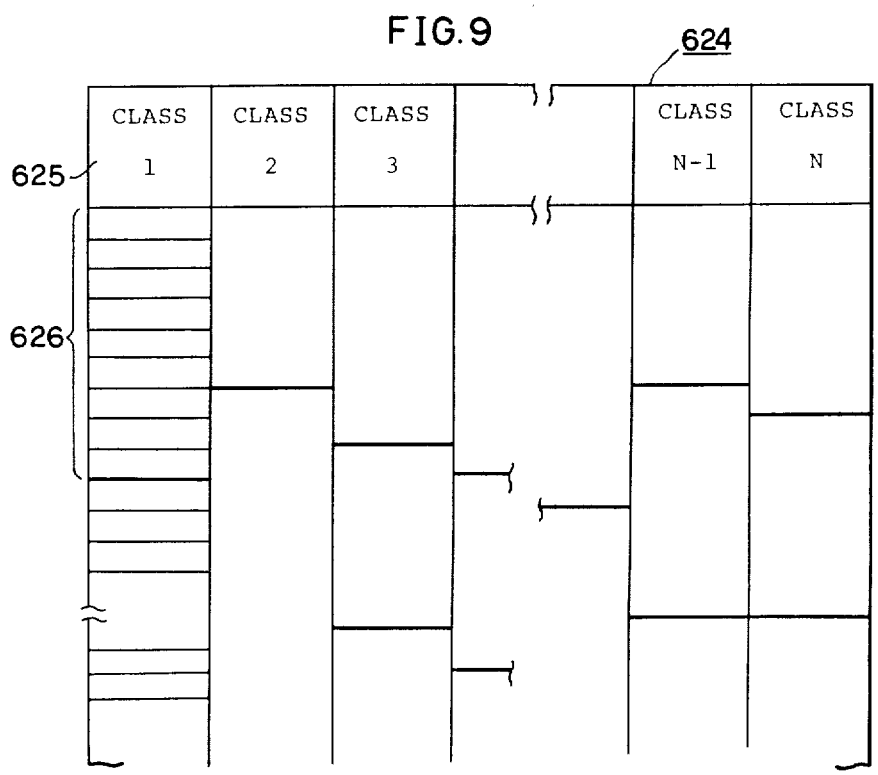
FIG. 9 illustrates the format of a transaction area in the same memory.

FIG. 8 illustrates the data structure as it is stored in the negative file 621 that is resident in the memory 62 within the balance settling machine 6. FIG. 9 shows the data structure as it is similarly stored in the transaction area 624.

In FIG. 8, the negative file 621 is used to hold the class code and the account number or transaction number for the customer card or in-house card that is treated as invalid, and contains a class code area 622 and a negative account number area 623.

The transaction area 624 is used for holding the transaction data received from the ECR 4, and consists of a class code area 625 and an area 626 that holds the account number or transaction number and transaction data which correspond to each class code in the class code area 625.

Figure 10:
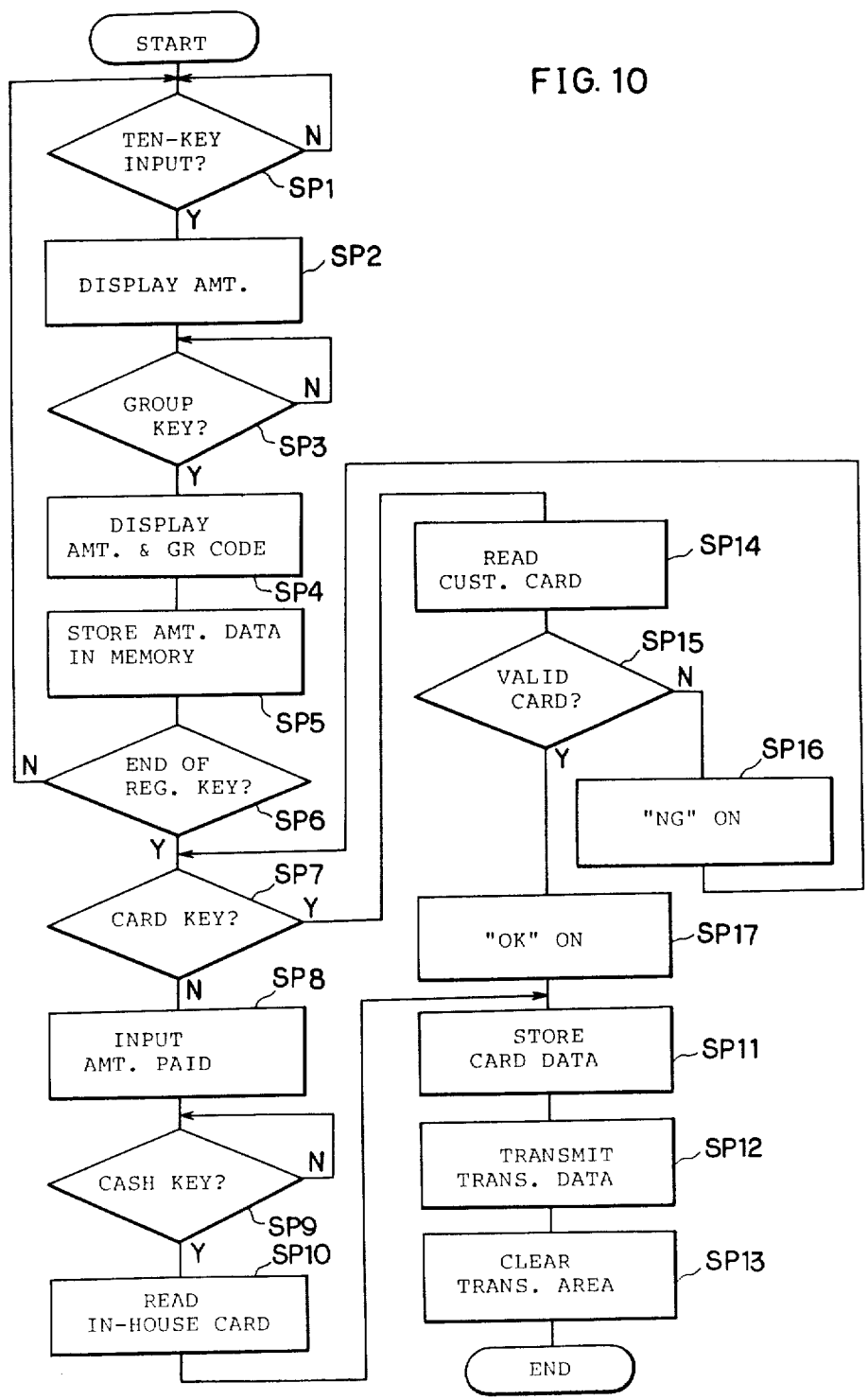
FIG. 10 is a flowchart showing the step-by-step operating sequence for the ECR.
Figure 11:
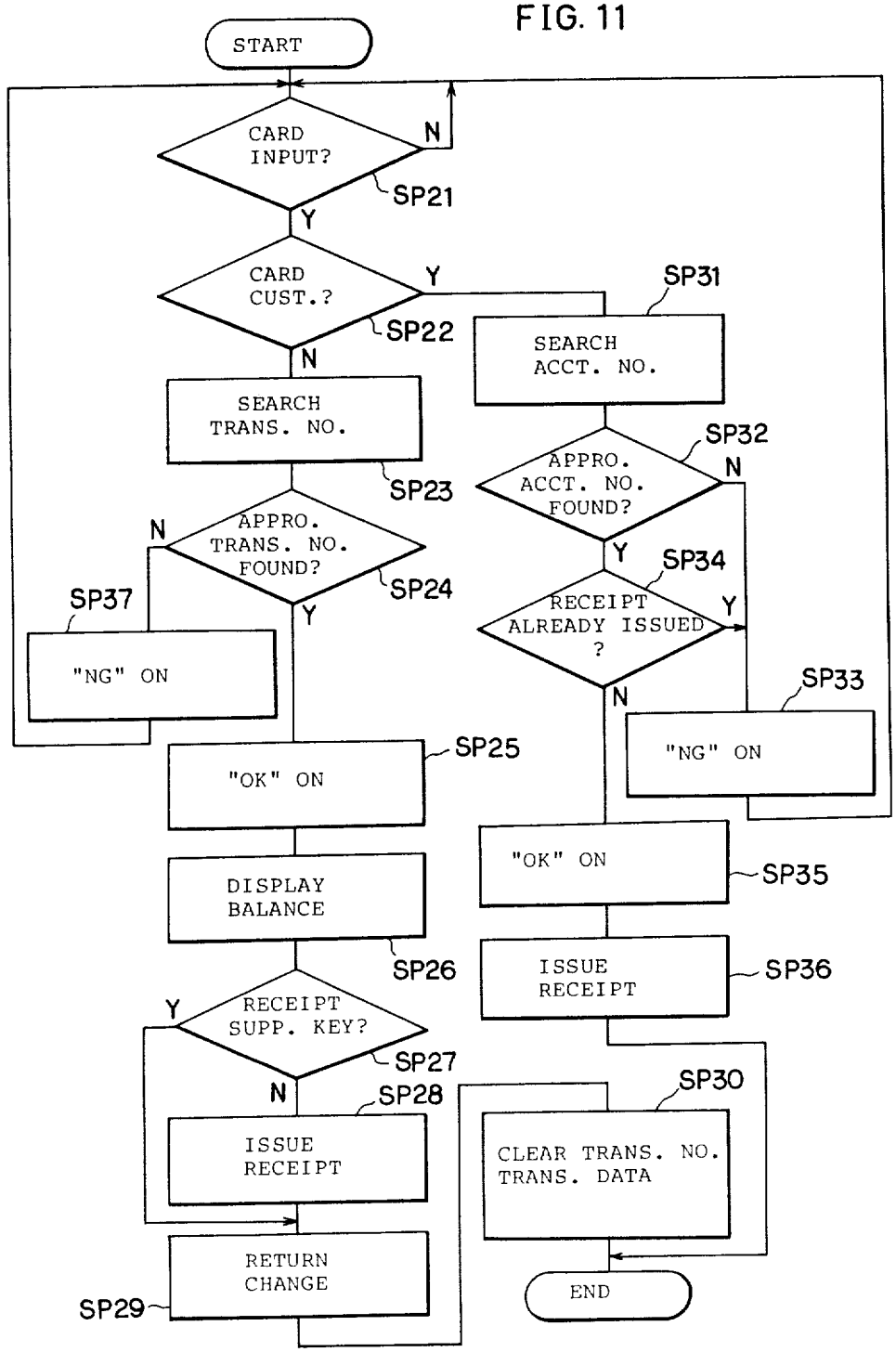
FIG. 11 is a flowchart showing the step-by-step operating sequence for the balance settling machine.
Figure 12:
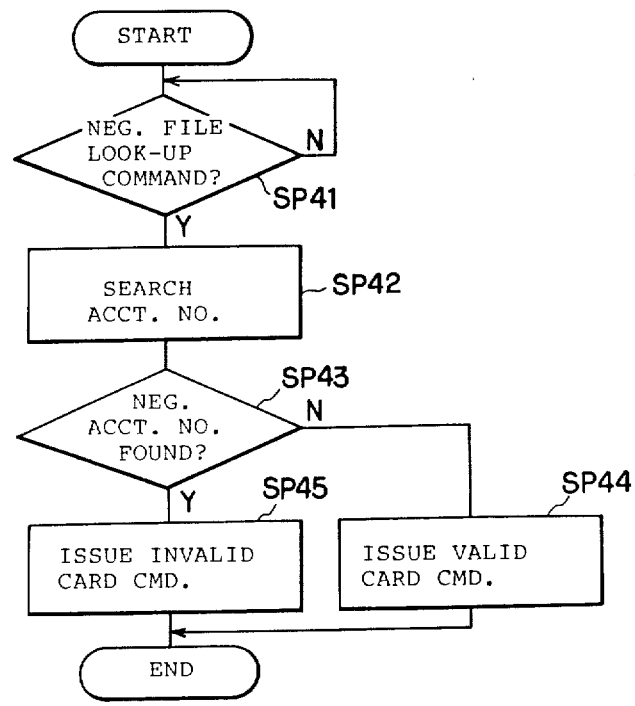
Figure 13:
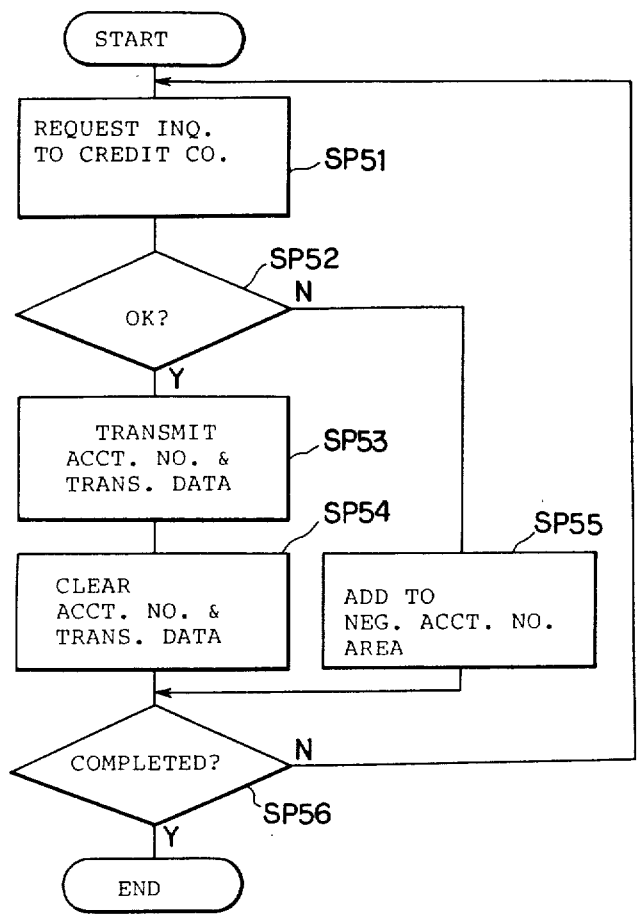
FIG. 13 is a flowchart showing the card-based transaction processing steps.

FIG. 10 is a flowchart representing the step-by-step operating sequence for the ECR, FIG. 11 is a flowchart representing the step-by-step operating procedure for the balance settling machine, FIG. 12 is a flowchart that represents the steps to be followed when the negative file within the balance settling machine is referenced, and FIG. 13 is a flowchart of the steps to be followed when a transaction using a customer card is processed.

The operation of the embodiment that has been described is next described in detail with particular reference to the flowcharts shown in FIGS. 10 through 13.

The following describes the operation sequence for the ECR:

After a customer has selected items of his or her choice, the customer carries those items to the location where any ECR is located, where he or she has the items registered by the operator on the ECR. When registering each item, the operator enters the data for the item on the keyboard 41 on the ECR 4. For example, if an item falls within Group 1 and is tagged at $10, the operator first enters "1" and "0" in this order by pressing the appropriate keys on the ten-key pad 412, and then enters "1", which implies "group 1", by pressing D1 key on the group key pad 413. In response to those entries, the CPU 43 within the ECR 4 starts at step SP1 (abbreviated as "SPxx" in the flowcharts, where xx are digits), checking to see whether entries have been made on the ten-key pad 412. If present, CPU 43 proceeds to step SP2, displaying the price data "$10" on the display 42. Then, when it ensures that the group code has been entered on the group key pad 413 at step SP3, CPU 43 proceeds to step SP4, displaying the group "1" on the display 42. Proceeding further to step SP5, CPU 43 stores those entries (price date of $10 and group code of 1) in the transaction area 444 within the memory 44 shown in FIG. 5.

At step SP6, CPU 43 checks the "End of Registration" key 415 has been pressed, and if not, goes back to step SP1. For the remaining items, the above described steps SP1 through SP6 are repeated. When all items have been entered, the operator operates the End of Registration key 415. When it is then determined at step SP6 that the End of Registration key has actually been pressed, CPU 43 adds up the figures for all registered items and presents the resulting sub-total on the display 42.

In the meantime, the operator asks the customer whether the current transaction should be settled on the credit card basis or cash basis. If the customer wants the cash transaction, the operator asks for the amount of money more than or equal to what is due. When he or she receives that amount, the operator enters the data on the amount received by pressing the appropriate keys on the ten-key pad 412. In this case, the Card key 418 is not used. Instead, the operator presses the Cash key 417 in order to identify that the customer is the cash customer.

At step SP7, CPU 43 checks that the Card key 416 has been operated. If not, CPU 43 proceeds to step SP8, storing the actual amount data as paid and entered on the ten-key pad 412 in the transaction area 444 as the temporarily received amount. At the next succeeding step SP8, CPU 43 checks that the Cash key 417 has been pressed. If pressed, CPU 43 subtracts the subtotal data from the temporarily received amount data stored in the transaction area 444 to find the balance of money to be returned to the customer. After then, CPU 43 stores the balance data in the transaction area 444 and presents the same data on the display 42.

After operating the Cash key 417 as described, the operator inserts an in-house card into the card reader 40. The information contained in the class code and transaction number fields on the in-house card (FIG. 4) is read from the card reader 40, from which it is passed to CPU 43 for processing (step SP10). As it then proceeds to step SP11, CPU 43 stores the class code and transaction number information on the in-house card as entered at step SP10 temporarily in the respective areas 442 and 443 within the memory 44. When the reading is completed, the operator removes the in-house card from the card reader and hands it over to the customer. Alternatively, an in-house card containing the class code and transaction number information may be issued by the card reader 40, and it may be handed to the customer.

For the card customer who wants the transaction settled on the credit basis, the action to be taken by the operator is to activate the End of Registration key 415, followed by activating the Card key 416. After activating the Card key 416, which is checked by CPU 43 at step SP7, the operator inserts the customer card into the card reader 40. The class code and account number information contained in the customer card is read by the card reader 40, from which it is passed to CPU 43. CPU 43 attempts to determine, at step SP15, whether or not the customer card is valid, based on the information as read from the customer card at step SP14. That is, CPU 43 adds this information as parameters to the negative file look-up command, which is sent to the balance settling machine 6 via the receive/send interface 45.

Within the balance settling machine 6, CPU 63 proceeds to the negative file look-up routine shown in FIG. 12, based on the negative file look-up command and class code and account number parameters that CPU 63 received from the ECR 4. On entry to this routine, CPU 63 initially attempts to determine, at step SP41, whether the negative file look-up command has been entered. If entered, CPU 63 goes further to step SP42, and attempts to scan the negative file 621 that resides in the memory 62 shown in FIG. 8 by using the received class code and account number parameters. At step SP43, an attempt is then made to check whether the appropriate negative account number is present. If not found, CPU 63 takes the path (step SP44) to issue a valid card command signal and send it back to the appropriate ECR 4. If found in the negative file 621, step SP45 is taken to issue an invalid card command signal to the ECR 4.

Within the ECR 4, it is determined that the card is valid or invalid, depending on whether the valid or invalid command signal has been received. If the invalid command signal is received, step SP16 is taken to turn on "NG" indicator. If the valid command signal is received, step SP17 is taken to turn "OK" indicator. In this case, CPU 43 then takes the path SP11, storing the class code and account number information on the customer card in the corresponding areas 442 and 443 in the memory 44. Going further to step SP12, CPU 43 retrieves the card data from the respective areas 442 and 443 and the transaction data from the transaction area 444, and send them to the balance settling machine 6. Those series of steps are concluded by clearing all the data associated with the current transaction from the areas 442, 443 and 444 at step SP13.

The following illustrates the operation sequence for the balance settling machine:

When the customer receives the in-house card from the operator, he or she goes to the balance settling machine 6 located near the exit port 2. At the balance settling machine 6, the customer inserts the in-house card into the card reader slot 60. In response, the CPU 63 within the machine 6 follows the processing steps as indicated in FIG. 11. The step begins with reading the class code and transaction number from the in-house card, and this information is passed from the card reader 60 to the CPU 63. At step SP21, CPU 63 checks to see whether the class code and transaction number or account number are input by using the card. If so, CPU 63 takes the path SP22 to determine whether it is the in-house card or the customer card, based on the class code information. When the in-house card, or the cash customer, is identified, CPU 63 takes the step SP23 to attempt to scan the transaction area 624 in the memory 62, based on the class code and transaction number infomation from the card. The transaction area 624 contains the transaction data sent from the ECR 4. At step SP24, CPU 63 checks whether the class code and transaction number corresponding to those that have previously been entered from the card are found in the transaction area 624. If not found, CPU 63 takes the step SP37 to turn on the "NG" indicator. If the appropriate transaction number is found, the step SP25 is taken to turn on the "OK" indicator, and the step SP26 is then taken to present the outstanding balance stored in the transaction area 624 on the display 64.

If the customer wants no receipt slip, he or she simply presses the receipt suppress key 68 located on the front panel of the balance settling machine 6. In this case, CPU 63 is programmed to take the step SP27 in order to determine whether the receipt suppress key 68 has been activated. If not activated, step SP28 is taken to allow CPU 63 to retrieve the data from the transaction data area 624 and send it to the printer 66. Thus, a receipt slip is printed out. If activated, the step SP28 is skipped over to step SP29. At the step SP29, if there is the balance data in the transaction area 624, the amount of money equivalent to that balance data is actually returned to the customer through the change outlet 65. At step SP30 following the SP29, the transaction number and transaction data are cleared from the transaction data area 626. This concludes the steps for the current transaction.

For the card customer, the customer is identified at step SP22. In this case, step SP31 is taken to allow CPU 63 to search the transaction area 624 for the account number. If the appropriate account number is not found (step SP32), step SP33 is then taken to turn on "NG" indicator. If it is found, the alternative action (step SP34) is taken to check that a receipt slip has already been issued. This is to ensure that a duplicate receipt slip will not be issued for the same customer. If not already issued, step SP35 is followed to cause the "OK" indicator to turn on, and at step SP36 following SP35 the data in the transaction area 624 is sent to the printer 66, from which a receipt slip is printed out.

FIG. 13 illustrates the data processing flow required for exchanging the credit business data between the balance settling machine 6 and the credit companies. This type of data processing usually occurs during the off-peak hours, such as the night. At an initial step SP51, CPU 63 issues an inquiry requesting that each credit company check for the correct account number. This request is transmitted through the telephone line interface 67 and over the telephone network to every credit company. Specifically, CPU 63 issues an inquiry command signal. This command signal contains the account number in question that is added as a parameter by CPU 63, and is transmitted to the control center within each credit company. At every control center, searching is made to check whether the account number inquiring is valid or not. If it is found valid, the appropriate control center (s) sends a signal or message back to CPU 63, telling that that account number is valid. When CPU 63 receives an invalid account number reply to the inquiry issued at step SP52, it takes the path to step SP55, recording that account number in the negative file area 621. When a "valid" reply is received, however, CPU 63 takes the alternative action (step SP53) and sends the account number and the contents of transaction data area 626 retained in the memory 62 to the appropriate credit company control center, through the telephone line interface 67 and over the telephone network. Following this, the account number and transaction data contained in the area 626 that have been sent are cleared (step SP54), and checking is made to ensure that all data in the transaction area 624 has been sent (step SP56). If not, the same steps as described above are repeated by returning to the step SP51. Alternatively the account number of membership number on an invalid credit card may previously be sent from the control center to CPU 63 so that they can be entered in the negative file 621.

It has been described that for the credit card-based transactions, all communication between the CPU 63 and credit company control centers occurs during the night. This means that all such transactions may be processed on a batch basis, not as each actually occurs. In the batch environment, all transactions can be processed at one time and with higher speed.

Instead of the batch processing, all transactions may be processed on real-time online basis as each actually occurs. In the real-time online environment, as each transaction actually occurs and when it is necessary to check whether the card is valid (step SP15), the CPU 43 within the ECR 4 may issue a look-up command signal and send it together with the parameters such as class code, account number and transaction data through its receive/send interface 45 to the balance settling machine 6. In response, the CPU 63 within the machine 6 may issue an inquiry signal and send it through its telephone line interface 67 to each credit company control center. If it receives a "valid card" reply to the inquiry, CPU 63 responds with sending the transaction data to the control center for the appropriate credit company, and issues a "normal end" command signal back to the CPU 43 within the ECR 4. If an "invalid card" reply is received, the CPU 63 sends a "invalid" command signal back to the CPU 43. Depending on whether the "normal end" command or "invalid" command is received, the CPU 43 within the ECR 4 may step to SP17 or SP16. In the real-time online environment, however, CPU 43 goes from step SP11 directly to step SP13, bypassing step SP12 for sending transaction data to the balance settling machine 6.

As the embodiment has fully been described, the subsidiary function is separated from the ECR so that it can be dedicated to the primary function of recording transactions. Instead, the subsidiary function such as receipt slip printing and balance processing is performed by an independent particular machine, or the balance settling machine 6. The operator can be relieved from the extra load, which may result from the subsidiary function. In commercial stores such as supermarkets where a great number of ECR's are to be installed, a fewer balance settling machines need only to be installed for that number of ECR's.

Although the present invention has been shown and described in conjunction with the particular applications such as cash-based or credit card based transactions, those applications may be extended to include the cash card-based transaction. For cash card-based application, the bank account number contained in the cash card may be read by the card reader 40 on ECR 4, and the transaction data including the account number read is sent to the balance settling machine. Then transfer of the transaction data including the account number may occur between the balance settling machine and the bank control center.

What is claimed is:

1. A transaction processing system comprising an electronic cash register machine and a balance settling machine, (1) said electronic cash register machine including:

input means for entering at least the figures representing the prices for the items or services purchased by a customer and the actual amount of money temporarily paid by the customer for the purchased items or services;

storage means for holding at least the cumulative records of the figures for the purchased items or services as entered from the input means;

arithmetic and logic means responsive when the amount of money as received is actually entered from the input means, for determining whether there is any outstanding balance of money to be returned, by comparing the actual amount of money and the cumulative figure records stored in the storage means and for calculating those two different data to find a balance data if the actual amount of money is greater than the total amount of the cumulative figure records;

first read/write means for writing an identifier code for identifying a particular customer onto a new recording medium to be handed to the particular customer and issuing the same recording medium, or for reading an existing recording medium containing the existing identifier code previously recorded; and data transmit means responsive when the balance calculation actually occurs within the arithmetic and logic means, for delivering to the balance settling machine the cumulative figure records stored in the storage means together with the customer's identifier code, as well as the balance data if it is determined by the arithmetic and logic means that there is the outstanding balance of money to be returned; and (2) said balance settling machine including:

second read means responsive when the customer actually inserts either of the recording mediums, for reading the identifier code contained in the recording medium;

receive means for accepting the data sent from the data transmit means within the electronic cash register machine;

print means responsive when the second read means actually reads the identifier code from the recording medium, for printing out the data associated with the particular customer's identifier code and accepted by the receive means on print medium and issuing a receipt slip; and change deliver means responsive when the second read means actually reads the identifier code from the recording medium, for determining whether the data accepted by the receive means contains the balance data and delivering the balance of money equivalent to the balance data if it is determined that it is contained.

2. A transaction processing system as defined in claim 1, wherein:

the first read/write means is capable of handling the data contained on credit card or cash card;

the arithmetic and logic means is responsive when the data contained in the card is actually read by the first read/write means, for determining whether the card is valid or invalid; and the data transmit means is responsive when it is actually determined by the arithmetic and logic means that the card is either valid or invalid, for delivering the cumulative figure records stored in the storage means to the balance settling machine.

3. An electronic cash register for connection to a balance settling machine, comprising:

input means for entering figures representing prices for items or services purchased by a customer and the actual amount of money paid by the customer for the purchased items or services;

storage means for holding cumulative records of the figures for the purchased items or services as entered from the input means;

arithmetic and logic means for determining whether there is any outstanding balance of money to be returned, by comparing the actual amount of money and the cumulative figure records stored in the storage means and for calculating the actual amount of money and the cumulative figure records to find a balance data if the actual amount of money is greater than the total amount of the cumulative figure records;

read/write means for performing at least one of the following functions:

(1) writing an identifier code for identifying a particular customer onto a new recording medium for the particular customer and issuing the same recording medium, (2) reading an existing recording medium containing the existing identifier code previously recorded; and data transmit means for delivering to the balance settling machine the cumulative figure records stored in the storage means together with the customer's identifier code, as well as the balance data if it is determined by the arithmetic and logic means that there is an outstanding balance of money to be returned.

4. An electronic cash register as defined in claim 3, wherein:

the read/write means is capable of reading the data contained on a credit card or cash card;

the arithmetic and logic means determining if the card is valid or invalid when the data contained on the card is read by the first read/write means; and the data transmit means delivering the cumulative figure records stored in the storage means to a balance settling machine when the arithmetic and logic means determines that the card is either valid or invalid.

5. A balance settling machine connectable to an electronic cash register, comprising:

read means responsive when a customer actually inserts a recording medium, for reading an identifier code contained in the recording medium;

receive means for accepting data sent from the electronic cash register machine, the data including cumulative figure records representing prices for items or services purchased by the customer, the customer's identifier code and balance data when there is an outstanding balance of money to be returned;

print means for printing out the data associated with the particular customer's identifier code and accepted by the receive means on print medium and issuing a receipt slip; and change deliver means for determining whether the data accepted by the receive means contains the balance data and delivering the balance of money equivalent to the balance data.

6. A method of processing a cash transaction on an electronic cash register for connection to a balance settling machine, comprising:

entering figures representing prices for items or services purchased by a customer and the actual amount of money paid by the customer for the purchased items or services;

storing cumulative records of the figures for the purchased items or services as entered from the input means;

determining whether there is any outstanding balance of money to be returned, by comparing the actual amount of money and the cumulative figure records stored and calculating the actual amount of money and the cumulative figure records to find a balance data if the actual amount of money is greater than the total amount of the cumulative figure records;

performing at least one of the following functions:

(1) writing an identifier code for identifying a particular customer onto a new recording medium for the particular customer and issue the same recording medium, (2) reading an existing recording medium containing the existing identifier code previously recorded; and delivering to the balance settling machine the cumulative figure records stored together with the customer's identifier code, as well as the balance data if it is determined by the arithmetic and logic means that there is an outstanding balance of money to be returned.

7. The method of claim 6, including:

determining if the card is valid or invalid when the data contained on the card is read; and delivering the cumulative figure records stored to a balance settling machine when it is determined that the card is either valid or invalid.

8. A method of processing a cash transaction on a balance settling machine connectable to an electronic cash register, comprising:

reading an identifier code contained in the recording medium when a customer actually inserts a recording medium;

accepting data sent from the electronic cash register machine, the data including cumulative figure records representing prices for items or services purchased by the customer, the customer's identifier code and balance data when there is an outstanding balance of money to be returned;

printing out the data associated with the particular customer's identifier code on print medium and issuing a receipt slip; and determining whether the data accepted contains the balance data and delivering the balance of money equivalent to the balance data.

* * * * *